US009734101B2

(12) United States Patent
Gomes

(10) Patent No.: US 9,734,101 B2
(45) Date of Patent: *Aug. 15, 2017

(54) MANAGING OVER-INITIATIVE THIN INTERRUPTS

(71) Applicant: International Business Machines Corporation, Armonk, NY (US)

(72) Inventor: Louis P. Gomes, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

This patent is subject to a terminal disclaimer.

(21) Appl. No.: 14/504,513

(22) Filed: Oct. 2, 2014

(65) Prior Publication Data

US 2015/0019781 A1    Jan. 15, 2015

Related U.S. Application Data

(63) Continuation of application No. 13/445,216, filed on Apr. 12, 2012, now Pat. No. 8,868,810.

(51) Int. Cl.
*G06F 13/24* (2006.01)

(52) U.S. Cl.
CPC .................... *G06F 13/24* (2013.01)

(58) Field of Classification Search
CPC ......... G06F 13/24; G06F 9/4812; G06F 3/061
USPC ................................................ 710/260, 262
See application file for complete search history.

(56) References Cited

U.S. PATENT DOCUMENTS

| 4,271,468 | A | * | 6/1981 | Christensen | G06F 13/26 710/39 |
| 4,349,873 | A |   | 9/1982 | Gunter et al. | 710/269 |
| 4,831,518 | A | * | 5/1989 | Yu | G06F 9/4812 340/2.26 |
| 4,888,691 | A | * | 12/1989 | George | G06F 3/0601 710/22 |
| 4,972,312 | A |   | 11/1990 | den Boef | 710/269 |
| 5,634,130 | A |   | 5/1997 | Lee | 710/260 |
| 5,761,427 | A | * | 6/1998 | Shah | G06F 13/128 709/223 |
| 5,896,523 | A |   | 4/1999 | Bissett et al. | |
| 5,983,308 | A | * | 11/1999 | Kerstein | G06F 13/1605 709/224 |
| 6,052,739 | A | * | 4/2000 | Bopardikar | G06F 9/4812 710/266 |
| 6,145,047 | A | * | 11/2000 | Garinger | G06F 13/24 710/260 |
| 6,189,066 | B1 | * | 2/2001 | Lowe | G06F 13/24 710/260 |
| 6,230,278 | B1 |  | 5/2001 | Li et al. | |

(Continued)

*Primary Examiner* — Paul R Myers

(74) *Attorney, Agent, or Firm* — Fleit Gibbons Gutman Bongini Bianco PL; Thomas S. Grzesik

(57) ABSTRACT

A method, system, and computer program product identify extraneous input/output interrupts for a queued input/output device architecture. At least one interrupt is determined to have been generated for at least one queue in a plurality of queues of a queued input/output device architecture. The interrupt is identified as an extraneous interrupt in response to the determining one of that the queue is associated with at least one reply message waiting to be dequeued for a previously processed interrupt, and that the queue fails to include at least one pending reply for a previously received unprocessed interrupt.

17 Claims, 8 Drawing Sheets

(56) References Cited

U.S. PATENT DOCUMENTS

| | | | |
|---|---|---|---|
| 6,266,732 B1 | 7/2001 | Chen et al. ................... 710/263 |
| 6,539,052 B1 | 3/2003 | Hessel et al. .................. 375/225 |
| 6,662,242 B2 | 12/2003 | Holm et al. ...................... 710/9 |
| 6,718,425 B1 | 4/2004 | Pajakowski et al. ......... 710/315 |
| 6,754,754 B1 * | 6/2004 | Quach ..................... G06F 13/24 |
| | | 710/260 |
| 7,111,157 B1 | 9/2006 | Hooper ............................. 713/1 |
| 7,251,815 B2 | 7/2007 | Donovan et al. ............. 718/105 |
| 7,278,058 B1 * | 10/2007 | Narisi ................... G06F 11/366 |
| | | 714/38.11 |
| 7,415,559 B1 | 8/2008 | Butterworth et al. ........ 710/261 |
| 8,185,783 B2 | 5/2012 | Lee et al. ................... 714/38.13 |
| 8,868,810 B2 * | 10/2014 | Gomes .................... G06F 13/24 |
| | | 710/260 |
| 2004/0227763 A1 | 11/2004 | Wichman et al. |
| 2005/0060443 A1 * | 3/2005 | Rosner ................. G06F 13/128 |
| | | 710/33 |
| 2006/0149878 A1 * | 7/2006 | Carmichael ............ G06F 13/24 |
| | | 710/263 |
| 2007/0127065 A1 | 6/2007 | Nishizawa ................... 358/1.15 |
| 2009/0019196 A1 * | 1/2009 | Chew ................. H04L 12/5693 |
| | | 710/54 |
| 2009/0182927 A1 | 7/2009 | Stevens et al. |

\* cited by examiner

MANAGING OVER-INITIATIVE THIN INTERRUPTS

CROSS-REFERENCE TO RELATED APPLICATIONS

This application is a continuation of and claims priority from prior U.S. patent application Ser. No. 13/445,216, filed on Apr. 12, 2012, the entire disclosure of which is herein incorporated by reference.

BACKGROUND

The present invention generally relates to input/output request processing, and more particularly relates to managing interrupts generated by input/output requests.

In a computing environment, an interrupt is generally referred to as the temporary stopping of the current program routine in order to execute some higher priority I/O (input/output) subroutine. Normally, an I/O interrupt occurs at the completion of each I/O stream and for the particular I/O device that executed the I/O stream. Therefore, a one-to-one relationship exists between the I/O interrupt and the execution of I/O stream on a particular I/O device. However, such a tightly coupled relationship may not be desirable with some of the newer I/O devices such as Queued Direct Input/Output (QDIO) and Queued Cryptographic I/O devices, which can comprise many queues for the same Queued I/O device. Therefore, an interrupt referred to as a "thin interrupt" is used for these devices to minimize the number of I/O interrupts that are generated for these I/O devices. A thin interrupt is generated for one or more queues rather than a particular I/O device. One problem with thin interrupts is that they can be over initiated. In other words, extra thin interrupts can be generated in situations where an interrupt is not required. Therefore, thin interrupts can cause the system to look for work that is not available quite frequently and cause system performance degradation.

BRIEF SUMMARY

In one embodiment, a method for identifying extraneous input/output interrupts for a queued input/output device architecture is disclosed. The method comprises determining that at least one interrupt is determined to have been generated for at least one queue in a plurality of queues of a queued input/output device architecture. The interrupt is identified as an extraneous interrupt in response to the determining one of that the queue is associated with at least one reply message waiting to be dequeued for a previously processed interrupt, and that the queue fails to comprise at least one pending reply for a previously received unprocessed interrupt.

In another embodiment, an information processing system for identifying extraneous input/output interrupts for a queued input/output device architecture is disclosed. The information processing system comprises a memory and a processor communicatively coupled to the memory. An interrupt handler is communicatively coupled to the memory and the processor. The interrupt handler is configured to perform a method. The method comprises determining that at least one interrupt has been generated for at least one queue in a plurality of queues of a queued input/output device architecture. The interrupt is identified as an extraneous interrupt in response to the determining one of that the queue is associated with at least one reply message waiting to be dequeued for a previously processed interrupt, and that the queue fails to comprise at least one pending reply for a previously received unprocessed interrupt.

In yet another embodiment, a computer program product for managing instructions within a processor is disclosed. The computer program product comprises a storage medium readable by a processing circuit and storing instructions for execution by the processing circuit for performing a method. The method comprises determining that at least one interrupt has been generated for at least one queue in a plurality of queues of a queued input/output device architecture. The interrupt is identified as an extraneous interrupt in response to the determining one of that the queue is associated with at least one reply message waiting to be dequeued for a previously processed interrupt, and that the queue fails to comprise at least one pending reply for a previously received unprocessed interrupt.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
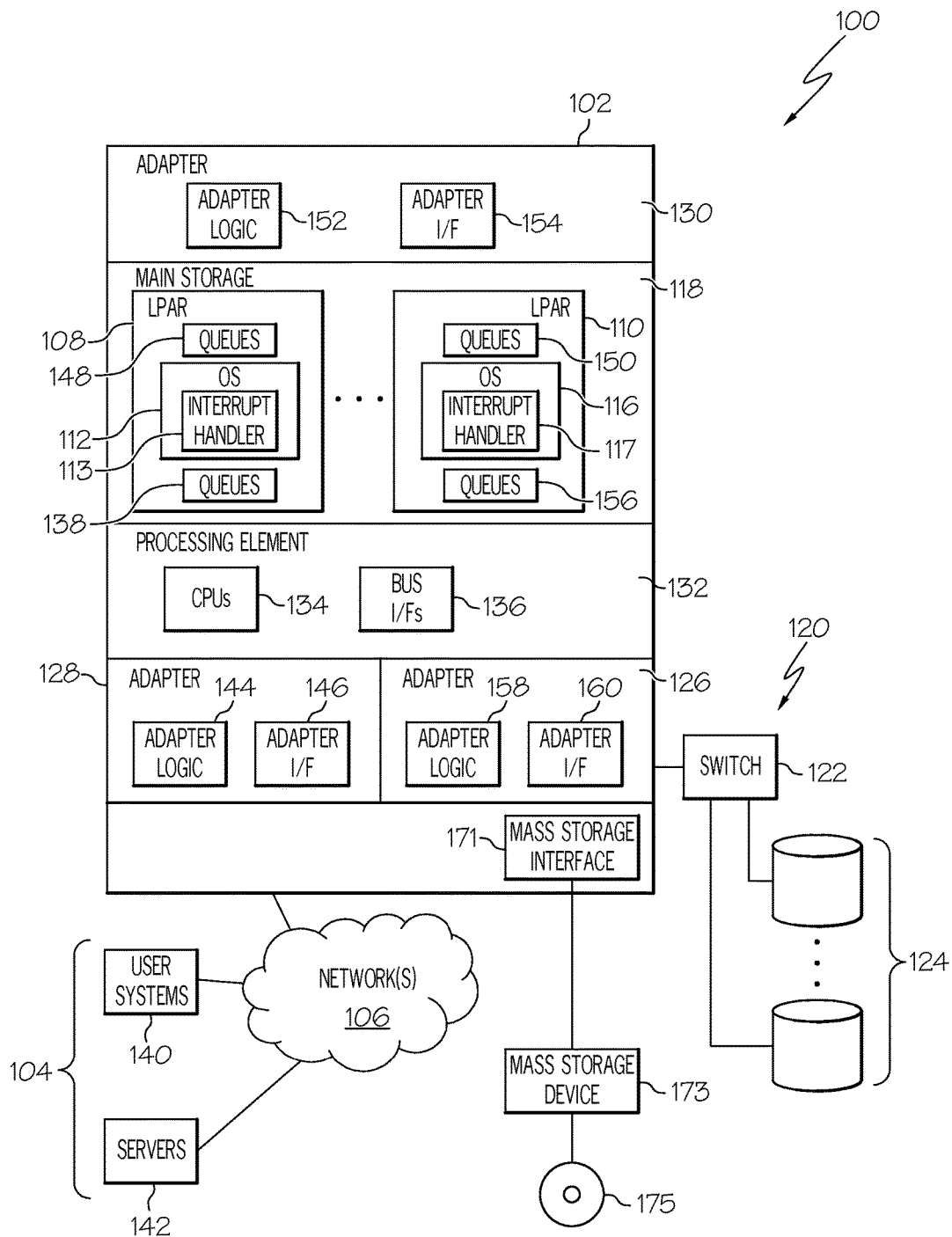
FIG. 1 is a block diagram illustrating one example of an operating environment according to one embodiment of the present invention.

FIG. 1 shows one example of an operating environment 100 applicable to various embodiments of the present invention. The system 100 of FIG. 1 includes a host system 102 in communication with remote systems 104 over a network 106. In at least one embodiment, the host system 102 is a high-speed processing device (e.g., a mainframe computer)

including at least one processing circuit (e.g., a CPU) capable of reading and executing instructions, and handling numerous I/O requests from the remote systems 104.

The host system 102 can include multiple logical partitions (LPARs) 108, 110 to support multiple operating systems (OSs) 112, 116, where the OSs 112, 116 are examples of programs that are executed by the host system 102. Each OS 112, 116 comprises, among other things, an interrupt handler 113, 117. The interrupt handler 113, 117, in this embodiment, is a thin interrupt handler. When a thin interrupt occurs on a CPU 134 that is currently enabled for thin interrupt, the thin interrupt handler 113, 117 in the OS 112, 116 gets invoked. The thin interrupt handler 113, 117 disables the CPU 134 for thin interrupts to avoid getting another thin interrupt on this CPU 134 while processing the current thin interrupt. The thin interrupt handler 113, 117 then processes the current thin interrupt and re-enables the CPU 134 for thin interrupts after the current thin interrupt has been processed. On a multi-CPU machine, CPUs that are currently enabled for thin interrupts can still receive thin interrupts even though other CPUs are currently disabled for thin interrupts.

The LPARs 108, 110 can function as separate virtual servers on the host system 102. The LPARs 108, 110 can be implemented in main storage 118, where main storage 118 is computer memory for the host system 102. The host system 102 can also interface with a storage network 120. The storage network 120 can include one or more switches 122 to access one or more storage devices 124. The storage devices 124 can include a variety of I/O devices, such as one or more small computer system interface (SCSI) devices. The one or more switches 122 may also perform protocol conversion, for instance Fibre Channel Protocol (FCP) to SCSI, where the host system 102 supports FCP via adapter 126.

The host system 102 can support a number of adapters for different communication paths between the OSs 112, 116 and other elements of the system 100. For example, an adapter 128 can be used to establish a communication path between the host system 102 and the network 106. Additionally, the adapter 130 supports communication between LPARs 108, 110, and thus the adapter 130 may be a totally virtual device simulated by firmware in memory. In one embodiment, the adapter 130 is an Open Systems Adaptor (OSA). The OSA provides a means to virtualize and abstract the details of the actual hardware Network Interface Card (NIC). The host communicates with the OSA and the OSA communicates with the NIC. A single OSA can simultaneously support hundreds of Operating Systems images, and thousands of host connections, and yet even more TCP/IP connections. The OSA provides many advantages, primarily in the area of sharing and virtualization.

A processing element 132 can be used to execute instructions on processing circuits (CPUs) 134 and interface with main storage 118 and adapters 126-130 via a bus interface 136. The bus interface 136 can support a variety of communication protocols known in the art. For example, the bus interface 136 can support a self-timed interface (STI) bus and a peripheral controller interface (PCI) bus, in addition to other bus protocols.

The remote systems 104 can issue I/O requests for retrieval of data from storage devices 124 of storage network 120. I/O requests from remote systems 104 can be received via network 106 at the adapter 128 and passed to queues 138 for further processing by the OS 112. The remote systems 104 may include user systems 140, such as desktop, laptop, or general-purpose computer devices, and servers 142. The network 106 may be any type of communications network known in the art, including wireless, wired, and/or fiber optic links. Additional computer systems (not depicted) can also be accessed via the network 106 or other networks. Adapter logic 144 and an adapter interface 146 can transfer I/O requests and data to the queues 138 in main storage 118. The OS 112 can interrogate the queues 138 and determine a course of action. The OS 112 can determine that an I/O request should be generated to access the storage network 120. In this example, an I/O request is written to queues 148 of LPAR 108 and transferred to queues 150 of LPAR 110 by adapter logic 152 and adapter interface 154 of adapter 130. The OS 116 transfers the I/O request to the queues 156 of the LPAR 110, where the adapter logic 158 and the adapter interface 160 transfers the I/O request to storage network 120. Completion status associated with the I/O request may follow a reverse communication flow.

In one or more embodiments, the queues 138, 148, 150, 156 are QDIO queues, iQDIO queues, or Queued Cryptographic I/O queues. The OSs 112, 116 construct the queues 138, 148, 150, 156 in the main storage 118. The queues 138, 148, 150, 156 can include input and output queues. The adapters 126-130 place data received from network 106, storage network 120, and cross-LPAR data into the queues 138, 148, 150, 156, enabling the OSs 112, 116 to access the data. Correspondingly, the OSs 112, 116 can place data in the queues 138, 148, 150, 156 for the adapters 126-130 to transmit. The adapters 126-130 and/or the OSs 112, 116 can also internally use data placed into the queues 138, 148, 150, 156 to provide configuration and status information.

The adapters 126-130 support direct memory access (DMA) to minimize interrupts and other overhead associated with passing data and status information between the adapters 126-130 and memory allocated by the OSs 112, 116 that is described by the queues 138, 148, 150, 156. Each of the queues 138, 148, 150, 156 may represent a queue set that provides for separate outbound and inbound queues. For example, each queue set can include four outbound and at least one inbound queue. Applications are assigned to at least one queue set which includes a number for input or output queues, and each queue set can share one or more of the adapters 126-130. The queue sets provide for a list of useable buffers and also a list of storage blocks for incoming/outgoing data. The buffers may be further prioritized to address specific application needs.

The OSs 112, 116 and the adapters 126-130 use a state change signaling protocol in order to facilitate the exchange of data. This protocol is applied to each input and output data buffer associated with each active input and output queue. Both input and output buffers are managed and exchanged between the OSs 112, 116 and the adapters 126-130 by placing buffers into various states which are maintained in a designated location that is set aside and is associated with each buffer. These states include ownership information that identifies either the program or the adapter as the controlling element of the buffer. For example, for input queues, asynchronous to the execution of the OSs 112, 116, the adapters 126-130 place data received from an associated I/O device into input buffers that are in an input buffer empty state. For each input buffer that has data placed into it by the adapters 126-130, the state of the buffer is changed from input buffer empty, which is an I/O-adapter-owned state, to input buffer primed, which is program-owned state. At the time the adapters 126-130 change the buffer states, the adapters 126-130 may also request an I/O interruption, specifically an I/O-adapter interruption, which is handled by the thin interrupt handlers 113, 117 of the OSs 112, 116. The OSs 112, 116, via the thin interrupt handler 113, 117, examine in sequence (such as round robin) the state of all input buffers associated with all QDIO input queues and process the data in each input buffer that is in the input buffer primed state. Upon completion of input buffer processing, the thin interrupt handlers 113, 117 can change the state of the buffers to input buffer empty in order to make the buffers available for reuse by the adapters 126-130 for subsequent transactions. When the OSs 112-116 change the state of one or more input queue buffers from primed to empty, a Signal Adapter instruction may be executed in order to signal the adapters 126-130 that one or more input buffers are available for use.

Similarly, for output queues, asynchronous to the execution of the adapters 126-130, the OSs 112, 116 can place output data into one or more QDIO output queue buffers that are in the output buffer empty state, output buffer not initialized state, or output buffer error state, which are program-owned states, and then change the state of each such buffer to the output buffer primed state, which is an adapter-owned state. At the time the adapters 126-130 change the buffer states, the adapters 126-130 may also request an I/O interruption, specifically an I/O-adapter interruption, which is handled by the thin interrupt handlers 113, 117. The thin interrupt handlers 113, 117 can execute a Signal Adapter instruction in order to signal the adapters 126-130 that one or more output queues have data to be transmitted. Asynchronous to the execution of the OSs 112, 116, the adapters 126-130 transmit the data in each QDIO output buffer that is in the output buffer primed state. Upon completion of transmission, the adapters 126-130 change the state of each such buffer to the output buffer empty state in order to make the buffer available for reuse by the OSs 112, 116.

Also, the system 102, in one embodiment, comprises a mass storage interface 171. The mass storage interface 171 is used to couple mass storage devices 173 to the system 102. One specific type of data storage device is a computer readable medium such as a Compact Disc ("CD") drive, which may be used to store data to and read data from a CD 175 or DVD. Another type of data storage device is a hard disk configured to support, for example, JFS type file system operations.

Figure 2:
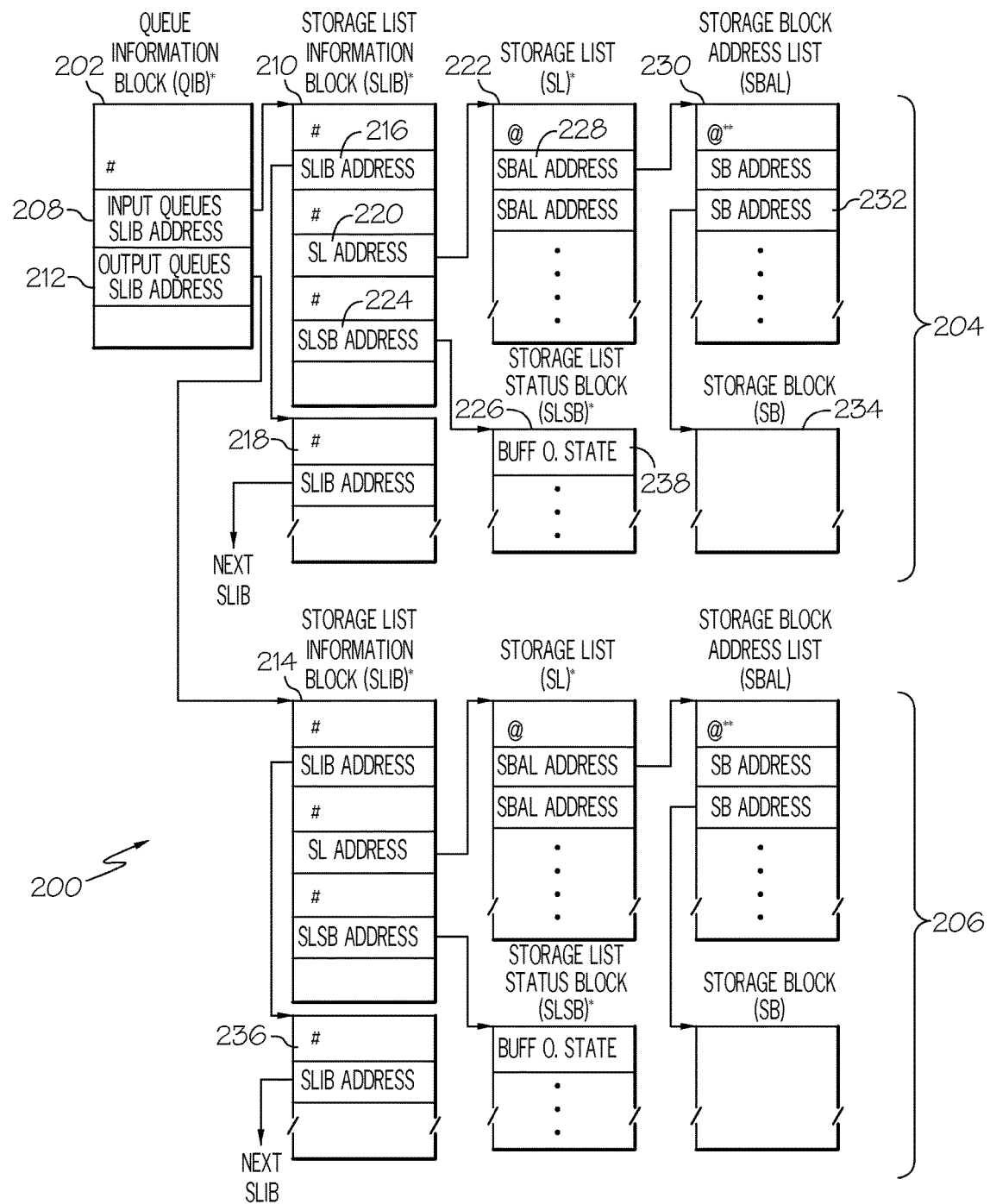
FIG. 2 is a block diagram illustrating one example of a queuing mechanism according to one embodiment of the present invention.

FIG. 2 shows a more detailed view of QDIO structures such as storage address buffer lists (SBALs), storage-list-state blocks (SLSBs), and buffer queues included within the system 102 of FIG. 1. QDIO structures are part of a data transfer architecture and allow direct access to memory on the host platform for TCP/IP data flow. The QDIO structures manage incoming or outgoing data. Specifically, the SBALs provide addresses of the memory blocks of a buffer corresponding to each buffer queue 138, 148, 150, 156. In one embodiment, each buffer queue may have one hundred twenty-eight SBALs. In addition, the SLSBs provide state information about data in the associated buffer queues. The hardware and software systems that interact to fill the buffer queues with data and retrieve data from the buffer queues use the states in the SLSBs to synchronize the necessary operations. The SLSB state determines whether the host device driver or the OSA has control over the corresponding buffers. Each SLSB state has a name and a numerical value. In one embodiment, each buffer queue may have one hundred twenty-eight SLSBs. In addition, the buffer queues 110 may include both input and output buffers. In certain embodiments, the number of buffers may also equal one hundred twenty-eight.

The queuing mechanism 200 shown in FIG. 2 is one embodiment that can be used to implement the queues 138, 148, 150, 156 of FIG. 1, where each of the queues 138, 148, 150, 156 of FIG. 1 may be a queue set of both QDIO input and output queues. A queue information block (QIB) 202 comprises information about QDIO input queues 204 and QDIO output queues 206. The QIB 202 includes an input queues storage list information block (SLIB) address 208 pointing to a SLIB 210 and an output queues SLIB address 212 pointing to SLIB 214. Each SLIB 210 and 214 includes a number of pointers. For instance, the SLIB 210 includes SLIB address 216 pointing to another SLIB 218, a storage list (SL) address 220 pointing to an SL 222, and a storage list status block (SLSB) address 224 pointing to an SLSB 226. In turn, the SL 222 includes a storage block address list (SBAL) address 228 pointing to an SBAL 230. SBAL 230 includes SBAL entries (SBALEs) 232, which may point to storage blocks 234. A similar structure is used for the QDIO output queues 206. In one embodiment, there are up to 32 QDIO input queues 204 and up to 32 QDIO output queues 206 defined per QIB 202.

The SLIBs, such as SLIBs 210, 214, 218, and 236, provide for addresses of information stored pertaining to each QDIO input and output queue 204 and 206. One SL, such as SL 222, is defined for each queue which contains an entry for each QDIO-I/O buffer. That is each SBAL, associated with the queue. Collectively, the storage blocks 234 addressed by all of the entries of a single SBAL 230 constitute one of the many possible QDIO buffers of a QDIO queue. In an exemplary embodiment, there are 128 possible QDIO buffers. Each SBAL is effectively a scatter/gather list that designates up to 16 storage areas that form the I/O buffer that an adapter uses to transfer data. Therefore, the SBAL 230 includes 16 SBALEs 232, each of which may designate a storage block 234 of the buffer.

Associated with a QDIO queue's 128 buffers is a 128-byte SLSB array of states, such as states 238. Each byte in the SLSB 226 comprises the state 238 of the corresponding buffer and acts as a finite state machine for the buffer. When an SLSB indicates that the corresponding buffer is in an adapter-owned state, the adapter (e.g., adapter 126 of FIG. 1) may use the buffer to transfer data, and the program (e.g., OS 116 of FIG. 1) does not reference or change the buffer. Contrariwise, when an SLSB indicates that the corresponding buffer is in a program-owned state, the program may reference and/or change the buffer, and the adapter does not use the buffer for data transfer. So that an adapter does not have to continuously poll the SLSB states, the Signal Adapter instruction is used by the program to signal an adapter that one or more SLSBs have been changed to the adapter-owned state. In other words, Signal Adapter instruction informs the adapter that it has some work to do.

The example of FIG. 1 depicts 3 types of QDIO queues. Queues 138 are referred to as "format-0" queues, which allow adapter 128 to attach to network 106. Queues 156 are referred to as "format-1" queues for attaching adapter 126 to storage network 120. In one embodiment, the storage network 120 provides an FCP channel path for communication with SCSI I/O devices as the storage devices 124. Queues 148 and 150 are referred to as "format-2" queues, which allow adapter 130 to attach to LPARs 108 and 110 forming an internal-queued-direct-communications (IQDC) channel path. Format-2 queues are used to move information between partitions in order to provide virtual-server to virtual-server network communications (e.g., HiperSockets). Depending on the configuration, format-0, format-1, and format-2 queues may all coexist within a single logical partition.

Managing Over-Initiative Thin Interrupts

As discussed above, thin interrupts are utilized for QDIO architectures to minimize the number of I/O interrupts that are generated for the I/O device. The individual Queued I/O Device architecture determines the conditions upon which a thin interrupt is generated. Extraneous thin interrupts (over-initiative thin interrupts) can be generated in situations where an interrupt is not required. Therefore, thin interrupts can cause the system to look for work that is not available and cause system performance degradation. Conventional systems generally cannot determine which thin interrupt was generated for which group of queues. This is because only one thin interrupt may be presented for multiple queues and multiple thin interrupts may be present when the thin interrupt handler is handling a thin interrupt. This makes identifying and discarding over-initiative thin interrupts difficult. Identifying and discarding over-initiative thin interrupts can become even more difficult when the QDIO devices are being shared by the test/application programs.

Therefore, one or more embodiments of the present invention provide for the management of thin interrupts such that over-initiative thin interrupts (OITIs) can be identified, discarded, tracked, counted, inspected, etc. These embodiments can be directed towards both shared and exclusively owned QDIO devices. In these embodiments, the thin interrupt handlers 113, 117 of the OSs 112, 116 are used to manage OITIs. For example, the thin interrupt handlers 113, 117 can discard and report OITIs that are generated by the QDIO devices, and also count and track the OITIs as well. The OITI counters can be inspected by the operator to see if the number of OITIs that are being generated by the QDIO devices exceed a given threshold.

In one embodiment, the thin interrupt handlers 113, 117 utilize various mechanisms for managing (e.g., discarding, reporting, etc.) OITIs generated by QDIO devices. For example, the thin interrupt handler 113 utilizes a global processed thin interrupt counter (GPTIC) and a global over-initiative thin interrupt counter (GOITIC) also referred to herein as an "extraneous interrupt counter". The GPTIC is used to keep track of the number of Thin Interrupts that have been currently processed. The GOITIC is used to keep track of the number of OITIs that have been currently processed. At any point in time, the operator may inspect the GPTIC counter and GOITIC counter, and calculate the percentage of OITI. This allows the operator to determine if the number of OITIs being generated exceeds a given threshold.

Each queue 138, 148, 150, 156 has a thin interrupt notification indicator (TINI) in storage that is defined by the respective OS 112, 116. In one embodiment, the queue numbers are sequential starting at zero, and the OS 112, 116 uses contiguous and sequential storage locations to define the TINI for each sequential queue number. Two arrays, INTR_Q_NI and GET_REPLIES, are defined whose index minus one is the queue number. For example, the first array index is one which represents queue zero. Another array, (VLD_INTR_Q_INDEX), is used to store all the valid (not over-initiative) thin interrupt queue indexes while thin interrupt handlers 113, 117 scan all the queues for thin interrupts after a thin interrupt is received.

In one example, the all the queues 138, 148, 150, 156 are empty (no work) to begin with. The test/application program(s) enqueue one or more asynchronous request messages into one or more queues 138, 148, 150, 156. When one or more of these asynchronous request messages are processed and the corresponding reply messages are placed in their corresponding queues 138, 148, 150, 156, at least one thin interrupt is generated by the system and the corresponding thin interrupt handler 113, 117 is invoked.

Since the state for which a thin interrupt is correctly generated is QDIO device architecture dependent, the thin interrupt state can be defined as follows. Since there can be multiple reply messages in the queue 138, 148, 150, 156, the device requests for a thin interrupt when there are no reply messages in the queue and the device places the first reply message into the queue. If more reply messages are placed in the queue before the test/application program removes them from the queue using the dequeue service of the OS 112, 116, the device does not request for another thin interrupt. The device does not request for another thin interrupt until the test/application program removes all the pending reply messages from the queue 138, 148, 150, 156 (thin interrupt reset state) and the device places the first reply message into the queue. The thin interrupt handler 113, 117 collects all the thin interrupt requests and then generates one thin interrupt when the CPU 134 is enabled for thin interrupt.

The thin interrupt handler 113, 117 locks a global thin interrupt lock (GLOBAL_INTR_LOCK) to prevent other thin interrupt handlers from updating the TINIs. The thin interrupt handler 113, 117 then scans all the queues to find all the queues that are associated with this thin interrupt by looking at the corresponding TINIs in the TINI array (INTR_Q_NI). The thin interrupt handler 113, 117 resets the value of all the TINIs that are determined to have received the thin interrupt. Also, the GPTIC is incremented by the number of TINIs with thin interrupts that are processed by this thin interrupt handler 113, 117.

For each queue 138, 148, 150, 156 that received the thin interrupt, if the thin interrupt handler 113, 117 determines that the thin interrupt is an OITI by querying the state of the queue, then the GOITIC is incremented by one and no further action is taken by the OS 112, 116 for this queue. Otherwise, the thin interrupt handler 113, 117 sets the TINT value into the local get replies array (DEQ_REPLIES) at the TINI index to indicate the results are now pending at that queue. When the test/application program requests the results of the operation, the OS 112, 116 obtains the results of the operation from the queue 138, 148, 150, 156 and returns it to the test/application program.

Figure 3:
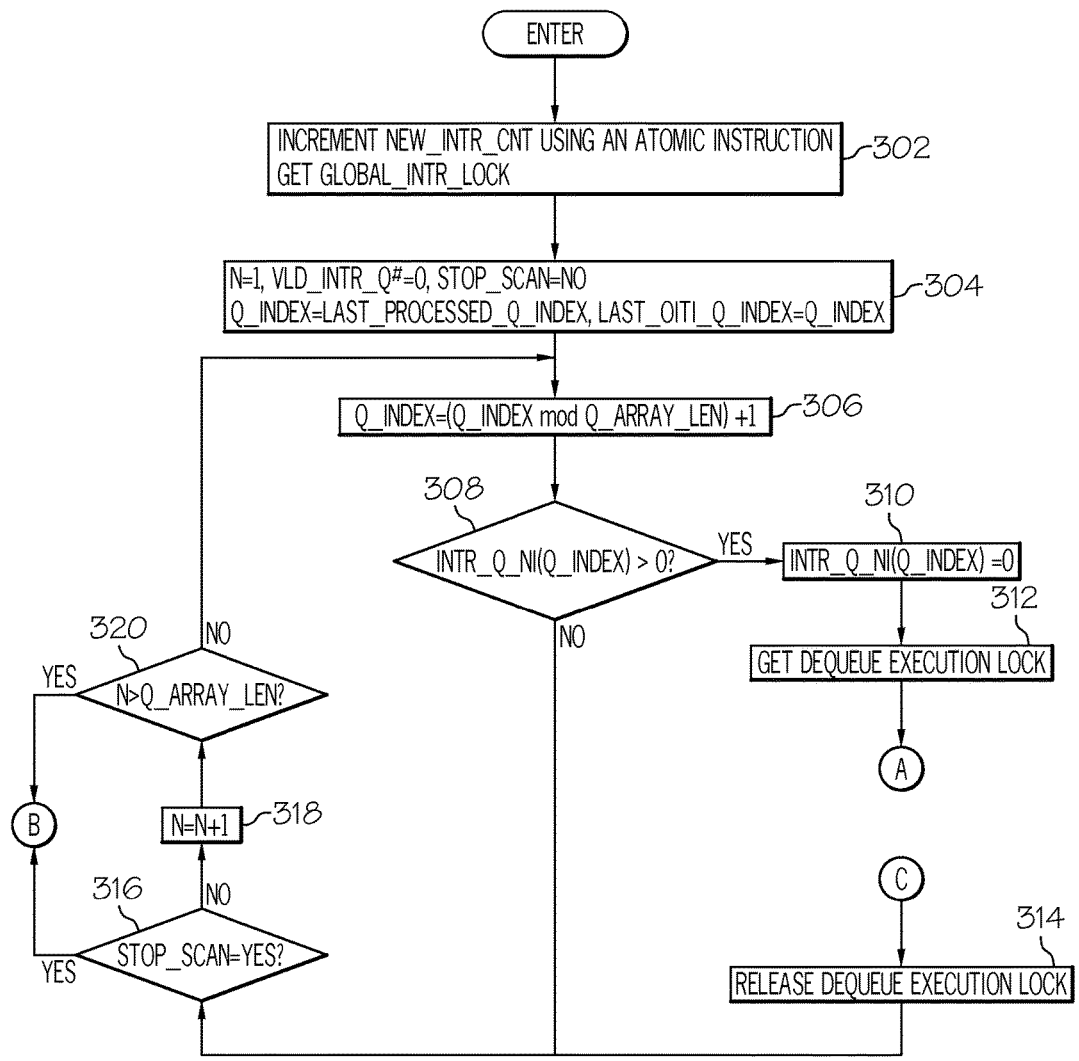
FIG. 3 is an operational flow diagram illustrating one example of a process for identifying all queues with a pending thin interrupt according to one embodiment of the present invention.

FIG. 3 is an operational flow diagram showing one example of how thin interrupt handlers 113, 117 scans and gathers the queues with pending thin interrupts with respect to application programs such as test/application programs. A test program is a specialized application program and generally tests all conditions (valid and error cases chosen pseudo-randomly) of one or more instructions and reports counters for each tested case. Test cases of a test program are designed to determine if each tested instruction works as designed. In one embodiment, a test program determines if a thin interrupt is an over-initiative thin interrupt as accurately as possible and keeps a count of total number of over-initiative thin interrupts as well as total number of thin interrupts so that the percentage of over-initiative thin interrupts may be measured. An application program, on the other hand, is generally not interested in measuring the percentage of over-initiative thin interrupts. Application programs are more concerned with not to look for work if the thin interrupt is determined to be an over-initiative thin interrupt.

Each thin interrupt handler 113, 117, at step 302, increments a new interrupt counter, NEW_INTR_CNT, using an atomic instruction in a loop until the counter is updated successfully. This method ensures that overlapping updates of this counter do not occur when multiple interrupt handlers are trying to update the value of this global counter concurrently. Overlapping updates would cause one or more updates to get lost. The thin interrupt handlers 113, 117 also request for the global thin interrupt lock (GLOBAL_IN-TR_LOCK). One of the thin interrupt handlers 113 obtains the lock and proceeds to process the thin interrupt. All other thin interrupt handlers 117 wait until the thin interrupt handler 113 that currently owns the global lock processes the thin interrupt and releases the lock. The next global lock waiter (e.g., thin interrupt handler 117) then obtains the lock and proceeds to process another thin interrupt. This process continues until there are no interrupt handlers waiting for the global thin interrupt lock.

The thin interrupt handler 113, at step 304, initializes loop variables. For example, the loop variable N is initialized to N=1, VLD_INTR_Q# is initialized to VLD_INTR_Q#=0, STOP_SCAN is initialized to STOP_SCAN=NO, Q_INDEX is initialized to Q_INDEX=LAST_PROCESSED_Q_INDEX, and LAST_OITI_Q_INDEX is initialized to LAS_T_OITI_Q_INDEX=Q_INDEX. LAST_PROCESSED_Q_INDEX represents the index of the last queue that was processed by the previous thin interrupt handler, and the initial value of this variable is set to 1 (representing the first queue index) when the OS was booted up. This method of using the LAST_PROCESSED_Q_INDEX as the starting queue index by the next thin interrupt handler allows the thin interrupt handlers to process all the queues 138, 148, 150, 156 in a round-robin method. Otherwise, the queues at the back end of the array may never get processed because the thin interrupt handlers keep processing the queues from the front end of the array first, and the dequeue service may time-out waiting for the thin interrupt from those back end queues. If the thin interrupt handler 113 is configured to count and show the percentage of OITIs, then both TOTAL_INTR_CNT and VLD_INTR_CNT are initialized to zero when the OS boots up.

The thin interrupt handler 113, at step 306, increments Q_INDEX by one in a round-robin fashion using, for example, the modulo math function. This method provides an easy way to process all the queues 138, 148, 150, 156 sequentially from the first queue to the last queue in the array and then starting from the first queue again. The thin interrupt handler 113, at step 308, determines if INTR_Q_NI (Q_INDEX) is greater than zero. If not, the control flows to step 316. If so, then the queue 138 at the queue index has received an interrupt. The thin interrupt handler 113, at step 310, then resets INTR_Q_NI(Q_INDEX) is to zero to indicate to the system that the thin interrupt at this queue 138 has been processed, and this queue 138 may be interrupted again. The thin interrupt handler 113, at step 312, obtains the dequeue execution lock for this queue 138 using a common lock manager. This is performed to ensure sure that the dequeue service does not change the state of the target queue by dequeuing reply message(s) using another CPU while the current thin interrupt handler 113 obtains the state of the target queue. The control then flows to the process shown in FIG. 4 where the thin interrupt handler 113 examines the queue state to see if this queue 138 should receive a thin interrupt. After the queue state examination process of FIG. 4, the thin interrupt handler 113, at step 314, releases the dequeue execution lock for this queue 138 using the common lock manager, and others are free to dequeue reply messages again.

The thin interrupt handler 113, at step 316 determines if STOP_SCAN is YES. If so, then the process of scanning and gathering the queues with pending thin interrupts is complete, and the control flows to the process shown FIG. 5. Otherwise, the thin interrupt handler 113, at step 318, increments N by one to indicate that the current queue inspection for pending thin interrupts is complete. The thin interrupt handler 113, at step 320, determines if N is greater than the queue array length. If so, the process of scanning and gathering all the queues with pending thin interrupts is complete, and the control flows to the process of FIG. 5. Otherwise, the control flow returns to step 306 and the thin interrupt handler 113 scans the next queue for pending thin interrupt.

Figure 4:
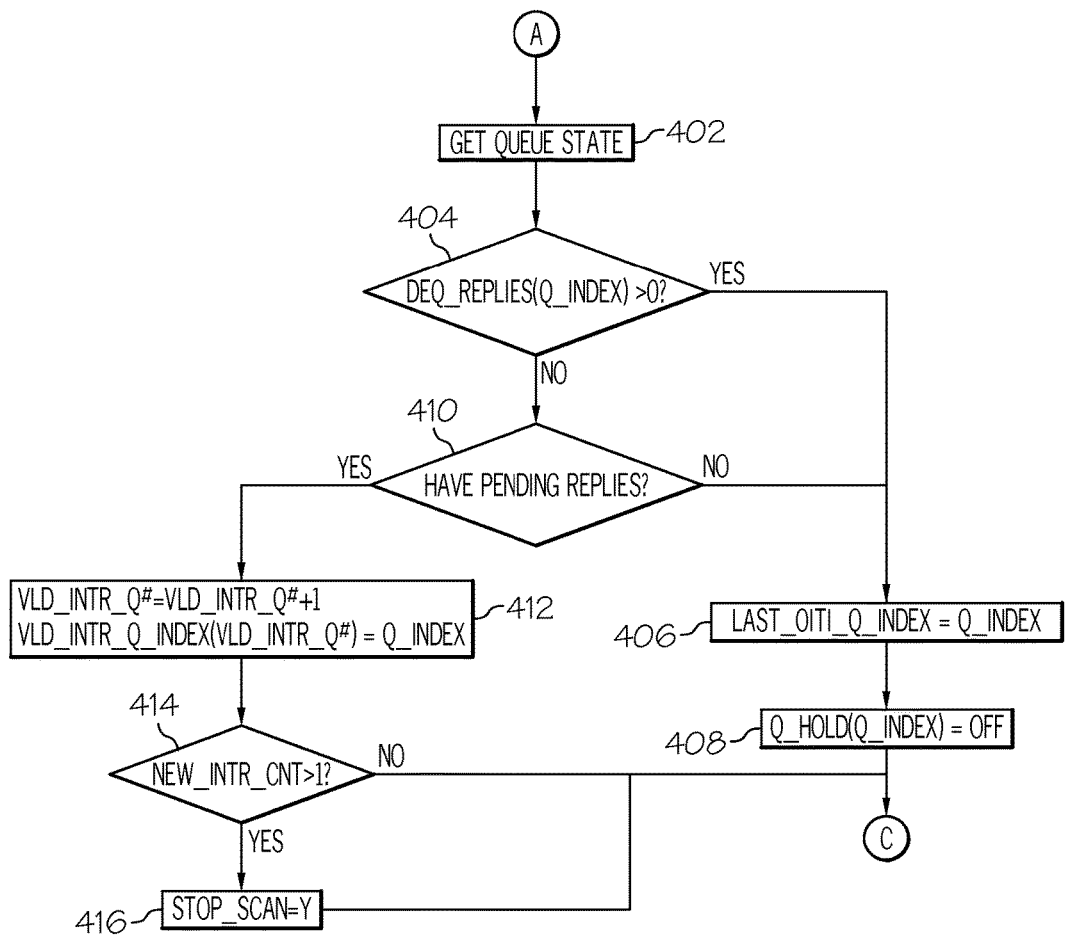
FIG. 4 is an operational flow diagram illustrating one example of a process for examining the queue state for a pending thin interrupt according to one embodiment of the present invention.

FIG. 4 is an operational flow diagram illustrating one process performed by a thin interrupt handler 113 for examining the queue state for a pending thin interrupt. This allows the thin interrupt handler 113 to see if this queue 138 should receive a thin interrupt. The thin interrupt handler 113, at step 402, obtains the current queue state of this queue 138 under the dequeue execution lock to make sure that no other CPU is changing the thin interrupt pending state by dequeuing replies from this queue 138.

The thin interrupt handler 113 then analyzes DEQ_REPLIES(Q_INDEX), which is an array comprising a local scrubbed copy of the INTR_Q_NI array. The DEQ_REPLIES is used by the dequeue service to remove work from a queue. A non-zero value in an entry of INTR_Q_NI array represents a thin interrupt for a specific queued I/O device queue. The thin interrupt handler process the non-zero entry of INTR_Q_NI array and changes the corresponding entry of DEQ_REPLIES array to a non-zero value to indicate that the corresponding queued I/O device queue has been correctly interrupted and has work (pending replies) to be removed by the dequeue service.

The thin interrupt handler 113, at step 404, determines if DEQ_REPLIES(Q_INDEX) is greater than zero. If so, this thin interrupt is considered to be an OITI. Therefore, the thin interrupt handler 113, at step 406, sets LAST_OITI_Q_INDEX to Q_INDEX to keep track of the last OITI processed by the thin interrupt handler 113. The thin interrupt handler 113, at step 408, sets Q_HOLD(Q_INDEX) to OFF for this queue 138 to indicate that all the test/application programs that are waiting for the thin interrupt from this queue 138 can be dispatched by the OS dispatcher. The control then flows to entry point C of FIG. 3. One reason for the above condition is that the system placed more reply messages into the same queue before the dequeue service had a chance to remove all the pending replies from the queue. A thin interrupt should not be generated for this condition and, therefore, this is an OITI.

Another reason for the above condition may be that the device sees one reply message in the queue, places another reply message into the queue (which normally would not be the case for requesting a thin interrupt), and then inspects the queue state and finds that only one reply message is in the queue. This implies that someone dequeued a reply message by the time the device inspected the queue state, but the device cannot determine if the dequeue occurred before (a thin interrupt is required) or after (a thin interrupt is not required) the second reply message was stored into the queue. Therefore, the device requests for a thin interrupt to avoid the missing thin interrupt condition. Since the device would use this case to compensate for under-initiative thin interrupt, the thin interrupt handler 113 treats this thin interrupt as an OITI.

If DEQ_REPLIES(Q_INDEX) is not greater than zero, the thin interrupt handler 113, at step 410, checks to see if the queue 138 has any pending reply messages. If the queue does not have any pending reply messages, then this thin interrupt is considered to be an OITI. For example, a non-zero entry of the DEQ_REPLIES array indicates that the corresponding queued I/O device queue has been correctly interrupted and has work (reply messages) to be removed by the dequeue service. So this information is associated with the thin interrupt that has been processed already by the thin interrupt handler. On the other hand, a reply may be pending (pending reply) due to a thin interrupt that either has or not has been processed already. So DEQ_REPLIES array can be used to differentiate the two cases of pending replies. If a new interrupt is received and there are no pending reply messages for an unprocessed interrupt that was previously received, the new interrupt is determined to be an OITI.

The control flows to step 406 where LAST_OITI_Q_INDEX is set to Q_INDEX to keep track of the last OITI processed by thin interrupt handler 113. Q_HOLD(Q_INDEX) is set to OFF for this queue 138, at step 408, and the control flows to entry point C of FIG. 3. If the queue 138 does not have any pending reply messages, the thin interrupt handler 113, at step 412, increments VLD_INTR_Q# by one to point to the next valid thin interrupt queue index array entry and the current queue index is stored into this valid thin interrupt queue index array entry (VLD_I NTR_Q_I NDEX(VLD_I NTR_Q#)).

The thin interrupt handler 113, at step 414, determines if NEW_INTR_CNT is greater than 1. If so, the thin interrupt handler 113, at step 416, sets STOP_SCAN to YES to indicate that the process of scanning and gathering the queues with pending thin interrupts is complete. One reason for not scanning the rest of the queues for more thin interrupts is to let the other pending thin interrupt handlers handle the rest of the queues to avoid flagging the rest of the pending thin interrupts as OITIs. Since there is no way of knowing which pending thin interrupt was generated for which set of queues, it is safest to assume that each pending thin interrupt generated at least one thin interrupt. With this method, the rest of the thin interrupt queues (left from multiple queues for same thin interrupt) are processed by the last pending thin interrupt handler. For both conditions, the control flows to the process shown in point C of FIG. 3.

Figure 5:
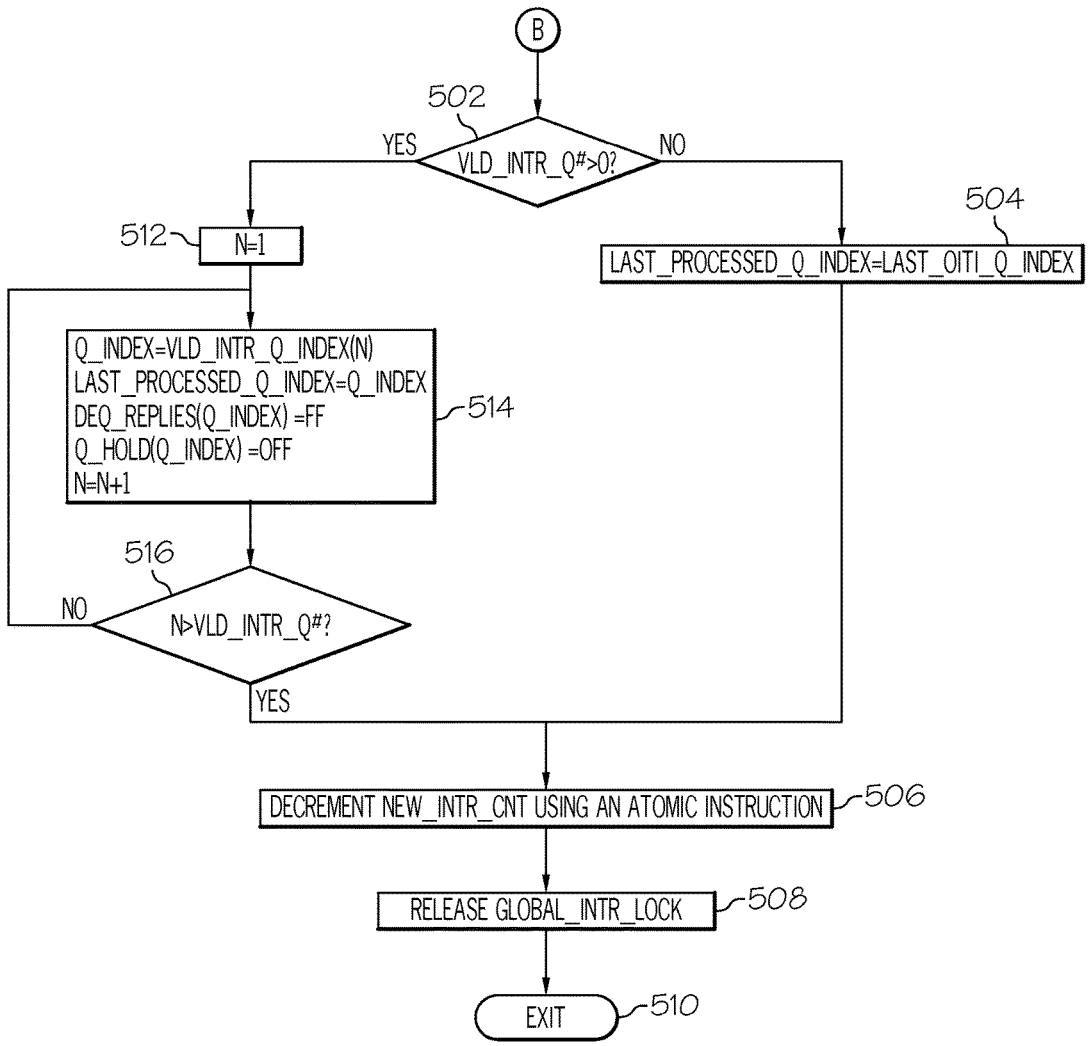
FIG. 5 is an operational flow diagram illustrating one example of a process for processing queues associated with valid thin interrupts according to one embodiment of the present invention.

FIG. 5 is an operational flow diagram showing one example of how the thin interrupt handler 113 processes the thin interrupt queues that have been placed in the valid thin interrupt queue index array (VLD_INTR_Q_INDEX). The thin interrupt handler 113, at step 502, determines if VLD_INTR_Q# is greater than zero. If not, the thin interrupt handler 113, at step 504, flags this thin interrupt as an OITI. The thin interrupt handler 113, sets LAST_PROCESSED_Q_INDEX to LAST_OITI_Q_INDEX to indicate the last processed thin interrupt queue and it will be used as the starting queue index by the next thin interrupt handler. The thin interrupt handler 113, at step 506, decrements NEW_INTR_CNT by one using an atomic instruction in a loop until the counter is updated successfully. The thin interrupt handler 113, at step 508, releases the GLOBAL_INTR_LOCK since processing of the thin interrupt is complete. The next thin interrupt handler is now free to take control and process the next thin interrupt. The control flow then exits at step 510.

If VLD_INTR_Q# is greater than zero, the thin interrupt handler 113, at step 512, initializes the loop variable (N) to one and the processing of all the thin interrupt queues that have been placed in the valid thin interrupt queue index array (VLD_INTR_Q_INDEX) begins. The thin interrupt handler 113, at step 514, sets Q_INDEX to the current valid thin interrupt queue index (VLD_INTR_Q_INDEX(N)). LAST_PROCESSED_Q_INDEX is set to the Q_INDEX to indicate the last processed thin interrupt queue and it will be used as the starting queue index by the next thin interrupt handler. DEQ_REPLIES(Q_INDEX) is set to a non-zero value (FF) to let the dequeue service know that a thin interrupt is processed for this queue 138 and that the reply messages can be dequeued. Q_HOLD(Q_INDEX) is set to OFF so the dequeue services that may be waiting for a thin interrupt for this queue 138 can be dispatched by the OS dispatcher to dequeue the pending reply messages. The loop variable (N) is incremented by one to process the next entry in the valid thin interrupt queue index array.

The thin interrupt handler 113, at step 516, determines if the loop variable (N) is greater than VLD_INTR_Q#. If not, the control flow returns to step 514 where the thin interrupt handler 113 processes the next entry in the valid thin interrupt queue index array. If the loop variable (N) is greater than VLD_INTR_Q#, the entire valid thin interrupt queue index array has been processed so the thin interrupt handler 113 exits the loop and the control flows to step 506. Once the global lock is released the next thin interrupt handler 113 is now free to take control and process the next thin interrupt.

Figure 6:
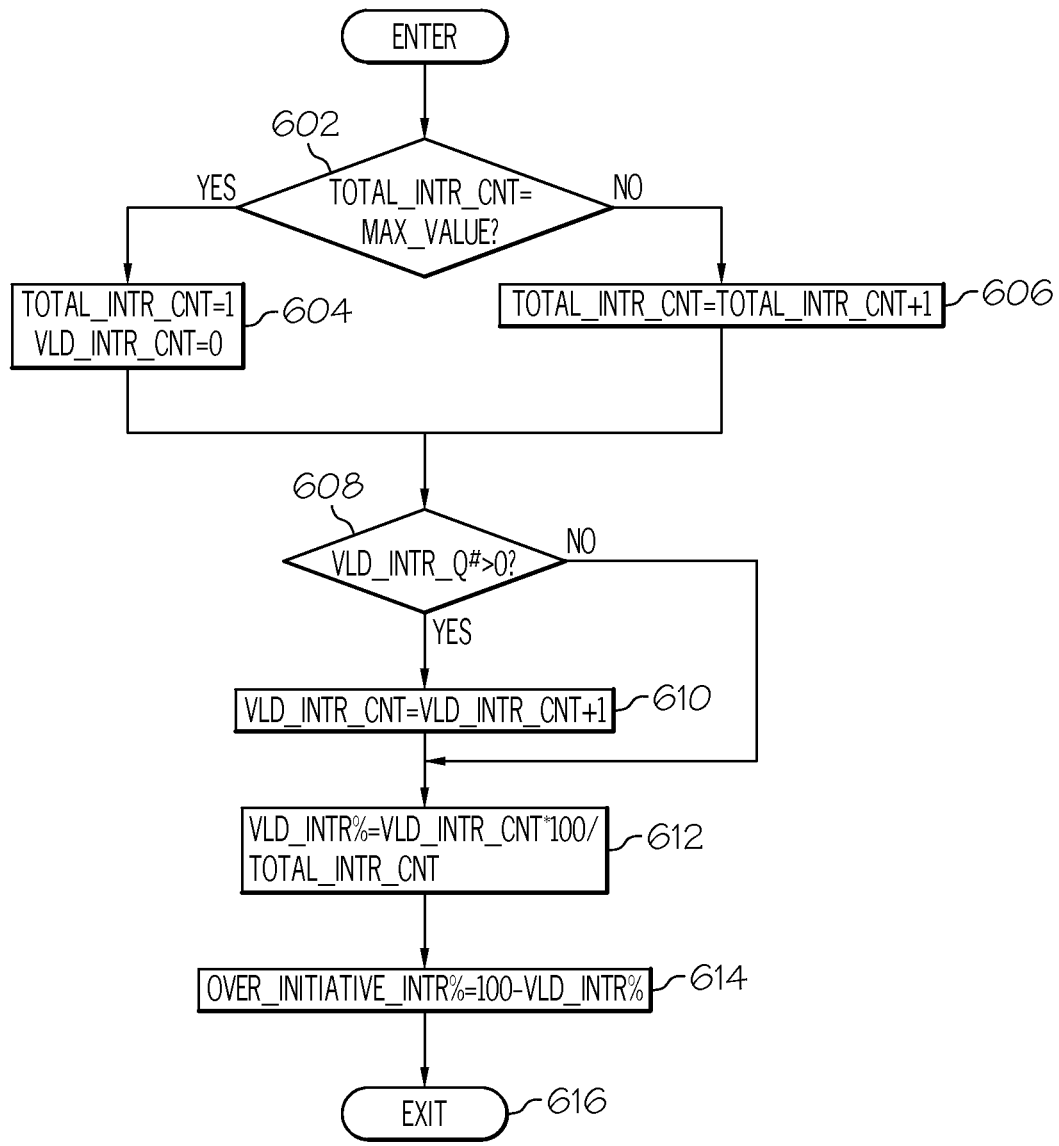
FIG. 6 is an operational flow diagram illustrating one example of a process for counting valid thin interrupts and calculating a percentage of over-initiative thin interrupts according to one embodiment of the present invention.

Finally, one may want to see the actual number of OITIs or the OITI percentage in order to determine if the number of OITIs is within an acceptable range. One example of a process for counting the OITIs and calculating the OITI percentage is shown in FIG. 6. The thin interrupt handler 113, at step 602, determines if TOTAL_INTR_CNT is greater than the maximum value that can be stored. If so, thin interrupt handler 113, at step 604, wraps and restarts the counters. This is performed by resetting TOTAL_INTR_CNT to one and VLD_INTR_CNT to zero. Otherwise, the thin interrupt handler 113, at step 606, increments TOTAL_INTR_CNT by one to show that another thin interrupt has occurred.

The thin interrupt handler 113 inspects the valid thin interrupt queue count. The thin interrupt handler 113, at step 608, determines if VLD_INTR_Q# is greater than zero. If so, the thin interrupt handler 113, at step 610, increments VLD_INTR_CNT by one to show that another valid (not over-initiative) thin interrupt has occurred. The thin interrupt handler 113, at step 612, calculates, the valid thin interrupt percentage (VLD_INTR %) by dividing VLD_INTR_CNT by TOTAL_INTR_CNT and multiplying this result by 100 to place the result in percentage form. The thin interrupt handler 113, at step 614, calculates the OITI percentage (OVER_INITIATIVE_INTR %) by subtracting the thin interrupt percentage (VLD_INTR %) from one-hundred (percent). The control flow then exits at step 616

It should be noted that the dequeue service that interlocks with this thin interrupt handler 113 can determine if the service should dequeue the pending reply messages due to the queue receiving a thin interrupt (DEQ_REPLIES(Q_INDEX)>0), or go to the suspended state due to the queue not receiving a thin interrupt (DEQ_REPLIES(Q_INDEX)=0). This determination can be made by setting the hold-flag to OFF (Q_HOLD(Q_INDEX)=OFF) for the queue and then calling the OS dispatcher to request for suspension until the hold-flag of the queue is set to ON (Q_HOLD(Q_INDEX)=ON) by the thin interrupt handler 113.

It should also be noted that the OITI count and percentage can be accessed in various ways. For example, one method is to store the OITI count and percentage in the OS storage area that can be viewed by the test operator. The location of this storage location can be disclosed to the operator. In another example, an operator interface can be created where the OITI count and percentage values are displayed on the operator console (or some other similar device) when requested by the test operator using a new command.

Figure 7:
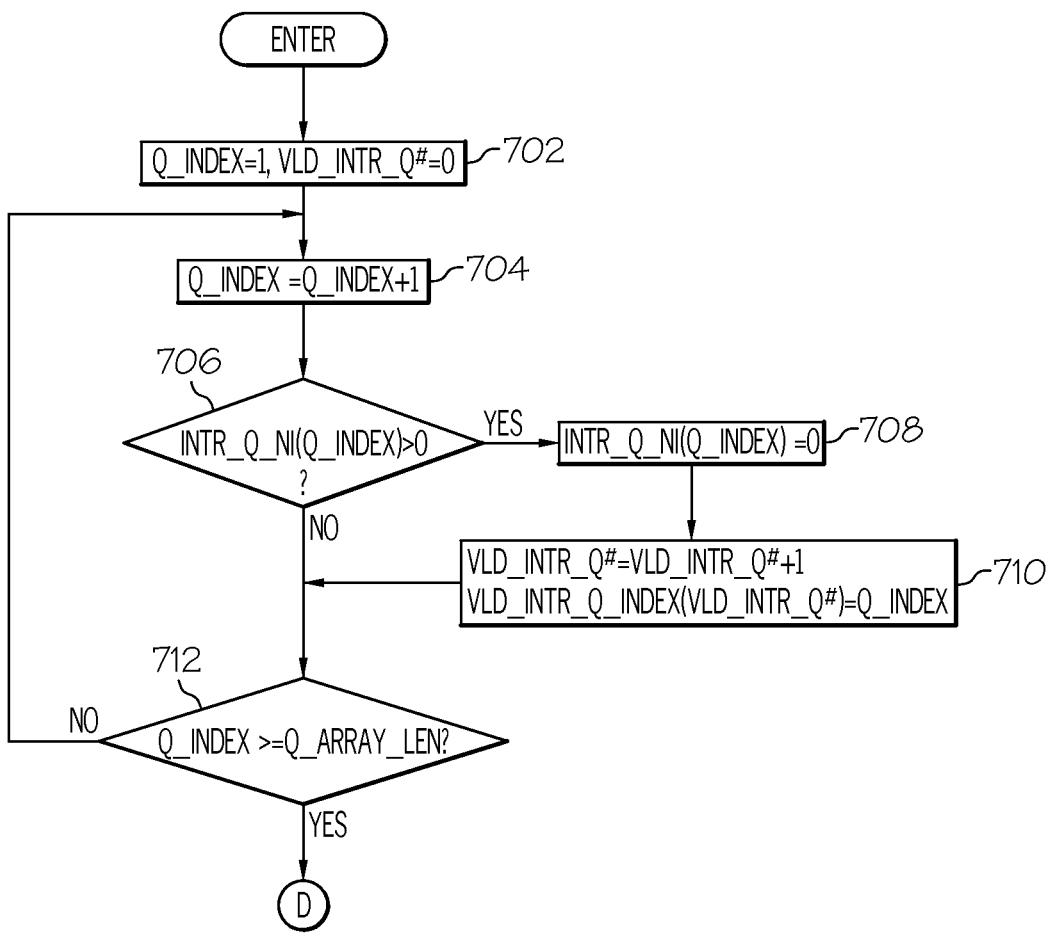
FIG. 7 is an operational flow diagram illustrating another example of a process for identifying all queues with a pending thin interrupt according to one embodiment of the present invention.
Figure 8:
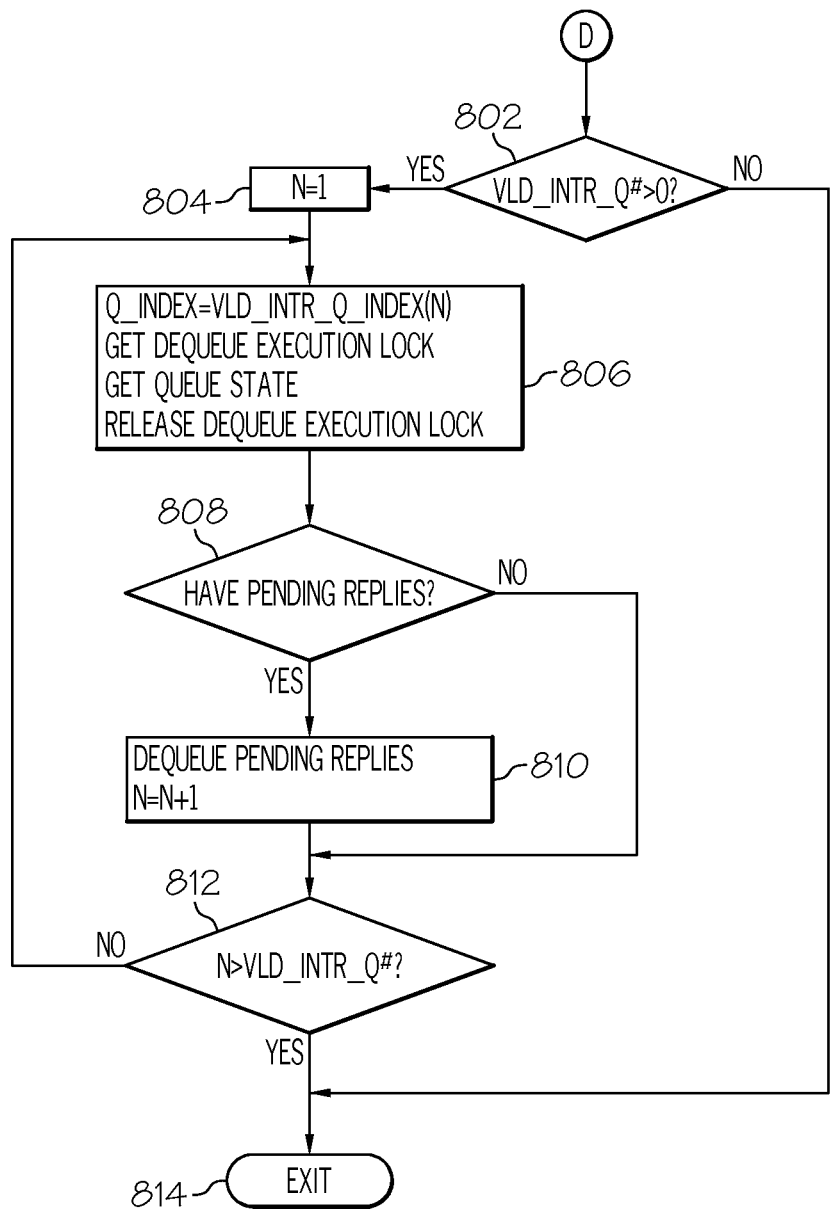
FIG. 8 is an operational flow diagram illustrating another example of a process for examining and processing queues associated with valid thin interrupts according to one embodiment of the present invention.

FIGS. 7-8 are operational flow diagrams illustrating another example of how a thin interrupt handler can manage thin interrupts for an application program such as a non-test/application program. With respect to non-test/application programs the thin interrupt handler 113, 117 can process as many thin interrupts as possible during the thin interrupt scan and gather processes. This is true even for the case where the thin interrupt handler 113, 117 is processing thin interrupts that belong to the next thin interrupt handler, and where the next thin interrupt handler would falsely detect OITIs as a result. The thin interrupt handler 113, 117 prevents unnecessary reply message dequeing operation. The reason for this is that the dequeue process is very costly since it takes much more time to try to dequeue a reply message as compared to query the queue state to determine if the queue has any reply messages to dequeue. Therefore, a large performance improvement can be gained by querying the queue state first to determine if the queue has any reply messages to dequeue. If there are any messages to dequeue, then attempting to dequeue the reply messages is worthwhile.

Turning now to FIG. 7, FIG. 7 shows how the thin interrupt handler 113, 117 scans and gathers the queues with pending thin interrupts for non-test/application programs. The thin interrupt handler 113, at step 702, initializes various loop variables. Q_INDEX is initialized to Q_INDEX=1 and VLD_INTR_Q# is initialized to VLD_INTR_Q#=0. The thin interrupt handler 113, at step 704, increments Q_INDEX by one. The thin interrupt handler 113, at step 706, determines if INTR_Q_NI(Q_INDEX) is greater than zero. If not, the control flows to step 712. If so, then the queue 138 at the queue index has received an interrupt from the hardware. The thin interrupt handler 113, at step 708, resets INTR_Q_NI(Q_INDEX) to zero to indicate that the thin interrupt at this queue 138 has been processed, and that this queue may be interrupted again. The thin interrupt handler 113, at step 710, increments VLD_INTR_Q# by one to point to the next valid thin interrupt queue index array entry and the current queue index is stored into this valid thin interrupt queue index array entry (VLD_INTR_Q_INDEX(VLD_INTR_Q#)). The thin interrupt handler 113, at step 712, determines if Q_INDEX is greater than the queue array length. If so, the process of scanning and gathering all the queues with pending thin interrupts is complete, and the control flows to the process shown in FIG. 8. Otherwise, the thin interrupt handler 113 loops back (to second assignment) and scans the next queue for pending thin interrupt.

FIG. 8 shows one example of how the thin interrupt handler 113 processes the thin interrupt queues that have been placed in the valid thin interrupt queue index array (VLD_INTR_Q_INDEX). The thin interrupt handler 113, at step 802, determines if VLD_INTR_Q# is greater than zero. If not, then this thin interrupt is an OITI and there is no reply message to dequeue. The thin interrupt processing is then complete and the control flow exits at step 814. The next thin interrupt handler is now free to take control and process the next thin interrupt.

If VLD_INTR_Q# is greater than zero, the thin interrupt handler 113, at step 804, initializes the loop variable (N) to one and the processing of all the thin interrupt queues that have been placed in the valid thin interrupt queue index array (VLD_INTR_Q_INDEX) begins. The thin interrupt handler 113, at step 806, sets Q_INDEX to the current valid thin interrupt queue index (VLD_INTR_Q_INDEX(N)).

The dequeue execution lock for this queue is obtained using the common lock manager. This is performed to ensure that the dequeue service does not change the state of the target queue by dequeuing reply message(s) using another CPU while the current thin interrupt handler 113 obtains the state of the target queue. Then the queue state is obtained to see if this queue 138 should receive a thin interrupt. The dequeue execution Lock for this queue 138 is released using the common lock manager, and others are free to dequeue reply messages again.

The thin interrupt handler 113, step 808, checks to see if the queue has any pending reply messages. If the queue does not have any pending reply messages, then this thin interrupt is considered to be an OITI, and there is no need to dequeue any reply message from this queue. Otherwise, the thin interrupt handler 113, at step 810, dequeues all the pending reply messages from this validly interrupted queue, and the loop variable (N) is incremented by one to process the next entry in the valid thin interrupt queue index array. The thin interrupt handler 113, at step 812, determines if the loop variable (N) is greater than VLD_INTR_Q#. if not, the thin interrupt handler 113 loops back to step 806 and processes the next entry in the valid thin interrupt queue index array. Otherwise, the entire valid thin interrupt queue index array has been processed so the thin interrupt handler 113 exits the loop at step 814.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method for identifying extraneous input/output interrupts for a queued input/output device architecture, the method comprising:
   determining, with a processor, that at least one interrupt has been generated for at least one queue in a plurality of queues of a queued input/output device architecture;
   determining a queue state associated with the queue; and
   identifying that the at least one interrupt is one of an extraneous interrupt and a valid interrupt based on the queue state associated with the queue, wherein identifying that the at least one interrupt is a valid interrupt is in response to the queue state indicating one of
   the queue fails to be associated with at least one reply message waiting to be dequeued for a previously processed interrupt, and
   the queue comprises at least one pending reply message for a previously non-processed interrupt,
   wherein the valid interrupt is processed by an interrupt handler.

2. The method of claim 1, wherein identifying that the at least one interrupt is an extraneous interrupt comprises at least one of:
   determining that the queue state indicates one of that the queue is associated with at least one reply message waiting to be dequeued for a previously processed interrupt; and
   determining that the queue state indicates that the queue fails to comprise at least one pending reply message for a previously received non-processed interrupt.

3. The method of claim 1, further comprising:
   setting a global lock for the at least one interrupt, wherein the global lock prevents interrupt handlers other than an interrupt handler associated with the at least one interrupt from processing the interrupt.

4. The method of claim 1, further comprising:
   updating an extraneous interrupt counter in response to identifying the at least one interrupt as being an extraneous interrupt.

5. The method of claim 4, further comprising:
   identifying a number of extraneous interrupts that have been received based on the extraneous interrupt counter; and
   displaying the number of extraneous interrupts that have been received to an user.

6. The method of claim 1, further comprising:
   updating a valid interrupt counter in response to identifying the at least one interrupt as being a valid interrupt.

7. An information processing system for identifying extraneous input/output interrupts for a queued input/output device architecture, the information processing system comprising:

a memory;
a processor communicatively coupled to the memory; and
an interrupt handler communicatively coupled to the memory and the processor, wherein the interrupt handler is configured to perform a method comprising:
determining that at least one interrupt has been generated for at least one queue in a plurality of queues of a queued input/output device architecture;
determining a queue state associated with the queue; and
identifying that the at least one interrupt is one of an extraneous interrupt and a valid interrupt based on the queue state associated with the queue, wherein identifying that the at least one interrupt is a valid interrupt is in response to the queue state indicating one of
the queue fails to be associated with at least one reply message waiting to be dequeued for a previously processed interrupt, and
the queue comprises at least one pending reply message for a previously non-processed interrupt,
wherein the valid interrupt is processed by an interrupt handler.

8. The information processing system of claim 7, wherein the identifying that the at least one interrupt is an extraneous interrupt comprises at least one of:
determining that the queue state indicates one of that the queue is associated with at least one reply message waiting to be dequeued for a previously processed interrupt; and
determining that the queue state indicates that the queue fails to comprise at least one pending reply message for a previously received non-processed interrupt.

9. The information processing system of claim 7, wherein the method further comprises:
setting a global lock for the at least one interrupt, wherein the global lock prevents other interrupt handlers from processing the interrupt.

10. The information processing system of claim 7, wherein the method further comprises: updating an extraneous interrupt counter in response to identifying the at least one interrupt as being an extraneous interrupt.

11. The information processing system of claim 7, wherein the method further comprises:
updating a valid interrupt counter in response to identifying the at least one interrupt as being a valid interrupt.

12. A computer program product for managing instructions within a processor, the computer program product comprising:
a storage medium readable by a processing circuit and storing instructions for execution by the processing circuit for performing a method comprising:
determining, with a processor, that at least one interrupt has been generated for at least one queue in a plurality of queues of a queued input/output device architecture;
determining a queue state associated with the queue; and
identifying that the at least one interrupt is one of an extraneous interrupt and a valid interrupt based on the queue state associated with the queue, wherein identifying that the at least one interrupt is a valid interrupt is in response to the queue state indicating one of
the queue fails to be associated with at least one reply message waiting to be dequeued for a previously processed interrupt, and
the queue comprises at least one pending reply message for a previously non-processed interrupt,
wherein the valid interrupt is processed by an interrupt handler.

13. The computer program product of claim 12, wherein the identifying that the at least one interrupt is an extraneous interrupt comprises at least one of:
determining that the queue state indicates one of that the queue is associated with at least one reply message waiting to be dequeued for a previously processed interrupt; and
determining that the queue state indicates that the queue fails to comprise at least one pending reply message for a previously received non-processed interrupt.

14. The computer program product of claim 12, wherein the method further comprises:
setting a global lock for the at least one interrupt, wherein the global lock prevents interrupt handlers other than an interrupt handler associated with the at least one interrupt from processing the interrupt.

15. The computer program product of claim 12, wherein the method further comprises:
updating an extraneous interrupt counter in response to identifying the at least one interrupt as being an extraneous interrupt.

16. The computer program product of claim 15, wherein the method further comprises:
identifying a number of extraneous interrupts that have been received based on the extraneous interrupt counter; and
displaying the number of extraneous interrupts that have been received to an user.

17. The computer program product of claim 12, wherein the method further comprises:
updating a valid interrupt counter in response to identifying the at least one interrupt as being a valid interrupt.

* * * * *